United States Patent [19]

Ona et al.

[11] Patent Number: 5,126,389
[45] Date of Patent: Jun. 30, 1992

[54] SILICONE RUBBER COMPOSITION FOR TREATMENT OF FIBER STRUCTURES

[75] Inventors: Isao Ona; Masaru Ozaki, both of Chiba, Japan

[73] Assignee: Dow Corning Toray Silicone Company, Ltd., Tokyo, Japan

[21] Appl. No.: 551,235

[22] Filed: Jul. 11, 1990

[30] Foreign Application Priority Data

Jul. 21, 1989 [JP] Japan .................. 1-190090

[51] Int. Cl.$^5$ ............................ C08J 5/10
[52] U.S. Cl. .................. 524/262; 524/379; 524/588
[58] Field of Search .......... 524/262, 379, 588

[56] References Cited

U.S. PATENT DOCUMENTS

| | | | |
|---|---|---|---|
| 3,957,714 | 5/1976 | Clark et al. .......... | 524/588 |
| 4,144,222 | 3/1979 | Shinmi et al. ........ | 524/588 |
| 4,421,783 | 12/1983 | Marwitz et al. ...... | 427/54.1 |
| 4,430,466 | 2/1984 | Cooper .............. | 524/262 |
| 4,474,908 | 10/1984 | Wagner .............. | 524/262 |
| 4,500,584 | 2/1985 | Modic ................ | 428/145 |
| 4,734,479 | 3/1988 | Inoue et al. ......... | 524/379 |

*Primary Examiner*—Melvin I. Marquis
*Assistant Examiner*—Karen A. Hellender
*Attorney, Agent, or Firm*—George A. Grindahl

[57] ABSTRACT

The silicone rubber compositions of the present invention for treatment of fiber structures are cured by a condensation reaction and are thus free from drawbacks of addition reaction curing type. The compositions contain mercaptoalkyl group-containing di- or trialkoxysilanes and aliphatic monohydroxy alcohols. As a result, even when inorganic filler content is increased in dispersion, viscosity stability was excellent, and high-strength films are readily obtained. Condensation reaction-curable silicone rubbers for treatment of fiber structure are provided which have excellent abrasion resistance and a pot life above 8 hours.

9 Claims, No Drawings

SILICONE RUBBER COMPOSITION FOR TREATMENT OF FIBER STRUCTURES

BACKGROUND OF THE INVENTION

The present invention concerns silicone rubber compositions for treatment of fiber structures, such as woven fabric, knit fabric, nonwoven fabric, etc. More specifically, the present invention relates to silicone rubber compositions for treatment of fiber structures, having long pot life and imparting films of excellent tensile strength, tear strength, and abrasion resistance.

Fiber structures, such as woven fabrics, knit fabrics and nonwoven fabrics, treated (especially coated) with conventional silicone rubbers are soft with excellent water-repellency, water-pressure resistance and also high moisture permeability. Thus they have been widely used in diaper covers, snow wear, mountain wear, sports wear, raincoats, tents, etc.

The silicone rubbers used for coating fiber structures are, e.g., addition reaction-curable silicone rubbers (Japanese Kokai Patents Nos. Sho 58(1983)-171937, Sho 60(1985)-51754 and Sho 57(1982)-165069) and condensation reaction-curable silicone rubber (Japanese Kokai Patent No. Sho 53(1978)-94693).

However, the silicone rubbers have some strong points and also some weak points, and both long pot life and desirable physical properties cannot be obtained at the same time.

For example, addition reaction-curable silicone rubbers form films with good tensile strength, tear strength, abrasion resistance, etc., while their adhesion to fiber structure is weak, and curing may be adversely affected by small amounts of surfactants and other impurities of phosphorus, nitrogen, sulfur compounds adhered to the fiber during processing of fibers or fabrics.

On the other hand, the condensation reaction-curable silicone rubbers show good adhesion to the fiber structure, while tensile strength, tear strength and abrasion resistance are not sufficient.

In the case of condensation reaction-curable silicone rubbers based on hydroxy-terminated organopolysiloxanes and organohydrogenpolysiloxanes, such drawbacks may be overcome by compounding inorganic reinforcing fillers such as finely powdered silica; while with increasing silica content, pot life decreases, and gelation occurs within 30 minutes, thus coating workability is poor.

BRIEF SUMMARY OF THE INVENTION

It is an object of the present invention to overcome the above-noted problems and provide condensation reaction-curable silicone rubbers for treatment of fiber structure, having excellent abrasion resistance and a pot life above 8 hours.

Such objectives can be attained by a silicone rubber composition for treatment of fiber structures comprising:

(A) 100 parts by weight of an hydroxy group-terminated organopolysiloxane,
(B) 0–50 parts by weight of an alkenyl group-terminated organopolysiloxane,
(C) 3–100 parts by weight of an inorganic filler,
(D) 0.1–20 parts by weight of an organohydrogenpolysiloxane,
(E) 0.1–20 parts by weight of a di- or trialkoxysilane containing a mercaptoalkyl group,
(F) 0.1–30 parts by weight of an aliphatic monohydroxy alcohol,
(G) 0.1–20 parts by weight of a curing catalyst, and
(H) an appropriate amount of solvent.

DETAILED DESCRIPTION OF THE INVENTION

The organopolysiloxane used for the component A is the main component of the coating materials of the present invention and is essentially a linear polysiloxane represented by the general formula $HO(R_2SiO)_nH$ wherein R is a substituted or unsubstituted monovalent hydrocarbon group and the subscript n is a number in the 50–10,000 range.

R represents an alkyl group such as methyl, ethyl, propyl, butyl, octyl, etc.; an alkenyl group such as vinyl, allyl, etc.; an aryl group such as phenyl, tolyl, etc.; a substituted alkyl group such as 3,3,3-trifluoropropyl, 3-chloropropyl, etc.

While n is in the range of 50–10,000, those values of n above 1,000, known as organopolysiloxane rubbers, are preferred. Essentially linear means that unless there are some adverse effects, branched, cyclic and three-dimensional structures may be present. All R groups may be the same or different; however, it is preferred that a majority of the R groups be alkyl, most preferably methyl. Organopolysiloxane A may be a homopolymer, a copolymer, or mixtures of two or more polymers.

The alkenyl group-terminated organopolysiloxane of component B is not an essential component; however, it enhances the elongation of the film when cured together with the component A. A vinyl group is especially preferred for alkenyl group. Other organic groups include those given for R above. As with component A, the degree of polymerization is preferably above 50, more preferably above 1,000, namely, organopolysiloxane rubber. Based on 100 parts by weight of component A, the amount of component B added is 0–50 parts by weight, preferably 5–30 parts by weight.

The inorganic fillers used as component C are needed for enhancing tensile strength, tear strength and abrasion resistance of cured film. While fumed silica is preferred, dry-process silica, wet-process silica, finely powdered quartz, titanium dioxide, calcium carbonate, kieselguhr, carbon black, etc., can be also be used. They may be use as mixtures of two or more, and they may be surface-treated with silanes, silazanes, low-molecular-weight polysiloxanes, organic compounds, etc. Based on 100 parts by weight of component A, the amount of component C added is 3–100 parts by weight, preferably 5–50 parts by weight.

The organopolysiloxane used as component D in the present invention is the crosslinking agent for component A and is linear, branched, or cyclic organohydrogenpolysiloxane of units of general formula $R_aH_bSiO_{(4-a-b)/2}$ wherein R is substituted or unsubstituted monovalent hydrocarbon group as defined above; a is 1–3; b is 0.5–1, containing at least 3 hydrogen atoms bonded to different silicon atoms. Preferred are linear, branched and cyclic methylhydrogenpolysiloxanes, dimethyl-co-methylhydrogenpolysiloxanes, methylphenyl-co-methylhydrogen polysiloxanes, etc., with a degree of polymerization 4–50. Based on 100 parts by weight of component A, the amount of component D used is 0.1–20 parts by weight, preferably 0.5–10 parts by weight.

The mercaptoalkyl group-containing di- or trialkoxysilane used as component E in the present invention is needed for pot life extension and can be represented by the general formula $HS(CH_2)_dSi(R)_e(OR^1)_{3-e}$ wherein R is a substituted or unsubstituted monovalent hydrocarbon group as given above; $R^1$ is an alkyl group of 1-5 carbon atoms; d is 2-6; e is 0 or 1. Preferably, d is 3, and R or $R^1$ is an alkyl group of 1-3 carbon atoms. Specific examples include $HS(CH_2)_3Si(CH_3)(OCH_3)_2$, $HS(CH_2)_3Si(CH_3)(OC_2H_5)_2$, $HS(CH_2)_3Si(CH_3)(OC_3H_7)_2$, $HS(CH_2)_3Si(OCH_3)_3$, $HS(CH_2)_3Si(OC_2H_5)_3$, $HS(CH_2)_3Si(OC_3H_7)_3$, $HS(CH_2)_5Si(OCH_3)_3$, $HS(CH_2)_3Si(CH_3)(OC_4H_9)_2$, etc. Based on 100 parts by weight of component A, the amount of component E used is 0.1-20 parts by weight, preferably 0.5-10 parts by weight.

The aliphatic monohydroxy alcohol used as component F is also a pot life-extending component used with component E; aliphatic monohydroxy alcohols of 1-5 carbon atoms are preferred. Especially, for component F, monohydroxy alcohols of 1-3 carbon atoms are preferred because they are readily evaporated upon heating without leaving any residues on fibers or any odor. Ethyl alcohol is most preferred. Based on 100 parts by weight of component A, the amount of component F used is 0.1-30 parts by weight, preferably 0.5-20 parts by weight.

The curing catalyst used for component G is a condensation reaction catalyst and promotes reaction between component A (also component B if present) and component D. The condensation reaction catalysts are organometallic catalysts and amine catalysts. Organometallic catalysts are metal salts of organic acids, e.g., dibutyltin diacetate, dibutyltin dilaurate, dioctyltin dilaurate, dibutyltin dioctoate, zinc naphthenate, tin octylate, cobalt octylate, diisooctyltin dioctylate, zirconium naphthenate, zirconium octylate, tetrabutyl orthotitanate, etc. Amine catalysts are, e.g., di- and triethanolamine. Based on 100 parts by weight of component A, the amount of component F used is 0.2-20 parts by weight, preferably 0.5-10 parts by weight.

The solvents used as component H in the present invention are used in making the compositions of the present invention into dispersions for easy application on fiber structure, e.g., aromatic hydrocarbon solvents such as toluene, xylene, benzene, etc.; chlorine-containing solvents such as carbon tetrachloride, trichloroethylene, 1,1,1-trichloroethane, tetrachloroethylene, etc.; aliphatic hydrocarbon solvents such as hexane, heptane, etc. Among them, aromatic solvents and chlorine solvents are preferred. While the amount of component H used varies as needed for ease of coating application, it is usually 50-2,000 parts by weight, preferably 100-1,000 parts by weight based on 100 parts by weight of component A.

In the present invention, beside components A-H, various additives may be added, such as various silane couplers for enhanced adhesion, hydroxy-terminated low-molecular-weight organopolysiloxanes as plasticizers, triorganosilyl group-terminated silicone oils for imparting lubricity and softness to the film, pigments, dyes, antimildew agents, etc.

The fiber structures are woven, knit, nonwoven fabrics, etc., of natural fibers such as cotton, jute, wool, silk, etc., regenerated fibers such as rayon, semisynthetics such as acetate, etc., synthetic fibers such as nylons, polyesters, acrylics, vinyl chloride, polyethylene, polypropylene, Spandex, etc., and their blends.

The mode of application on fiber structures is not restricted in any particular way, while in a preferred process, films are formed by gravure or knife coating on the fiber structure and cured by heat. If desired, a silicone rubber composition of the present invention is coated on a Teflon sheet, etc., adhered to a fiber structure and heat-cured for adhesion of the silicone rubber to the fiber structure. Depending on the applications, immersion or spray method may be used. After solvents are evaporated, the treated fiber structures are heated at 100°-200° C. for 1-5 min to form a silicone rubber film on the fiber structure, with good toughness and moisture permeability.

The fiber structure treated with the silicone rubber compositions of the present invention have good toughness and moisture permeability, thus are useful for diaper covers, snow wear, mountain wear, sports wear, raincoat, tent, etc.

Next, the present invention is explained with examples. In the examples, parts and % are by weight.

APPLICATION EXAMPLES 1 AND 2

In a kneader mixer, 100 parts of hydroxy-terminated dimethylpolysiloxane of molecular weight about 520,000, 9 parts of hydroxy-terminated dimethylpolysiloxane plasticizer with degree of polymerization 10, and 30 parts of fumed silica (Aerosil 300, product of Nippon Aerosil Co.) of specific surface area 300 m²/g were kneaded sufficiently and heated at 180° C. for 4 h to give a rubber base (I).

Using a stirrer 100 parts of this rubber base (I) were compounded with 3.2 parts of trimethylsilyl-terminated methylhydrogenpolysiloxane with degree of polymerization about 50 and 246.8 parts of toluene to give dispersion (I). This dispersion was rapidly stir-mixed with 1.0 part of $HS(CH_2)_3Si(CH_3)(OCH_3)_2$, 1.5 parts of methyl alcohol or 1.5 parts of isopropyl alcohol, 1.0 part of dibutyltin di(2-ethylhexoate) catalyst, and 25 parts of toluene for viscosity control. Then changes in viscosity with elapse of time was measured using a single cylinder rotating viscometer, Bisumetoron VG-A (product of Seiki Industrial Co., Ltd.). After 10 h, the dispersion was coated on a polytetrafluoroethylene (Teflon) film using a 100-μm applicator, and the ease of coating application was examined. Next, most of toluene was removed by blowing hot air, and a nylon taffeta was spread on the coating. Then, the silicone rubber was cured by heating in a hot-air circulation oven at 150° C. for 5 min. The assembly was then cooled to room temperature, and the Teflon film was peeled from the silicone rubber-coated nylon taffeta. The silicone coating film was examined.

For comparison, the experiment was repeated without methyl alcohol or $HS(CH_2)_3Si(CH_3)(OCH_3)_2$ or both. In all cases, gelation occurred quickly, while the composition of the present invention, using both methyl alcohol and $HS(CH_2)_3Si(CH_3)(OCH_3)_2$ showed stable viscosity even after 10 h with good coating workability, giving coated films free from voids. The results are given in Table I.

TABLE I

| | Application Example | | Comparative Example | | |
|---|---|---|---|---|---|
| | 1 | 2 | 1 | 2 | 3 |
| Composition, parts | | | | | |
| Dispersion | 100 | 100 | 100 | 100 | 100 |
| HS(CH₂)₃SiMe(OMe)₂ | 1.0 | 1.0 | — | — | 1.0 |
| Methanol | 1.5 | — | — | 1.5 | — |
| Isopropanol | — | 1.5 | — | — | — |
| Properties | | | | | |

TABLE I-continued

|  | Application Example | | Comparative Example | | |
|---|---|---|---|---|---|
|  | 1 | 2 | 1 | 2 | 3 |
| Change of Viscosity (cP) with time | | | | | |
| 0 Hours | 8200 | 8400 | 9200 | 8700 | 9050 |
| 0.5 Hours | 8100 | 8200 | gel | gel | 8800 |
| 1 Hours | 8100 | 8200 | — | — | 9000 |
| 2 Hours | 8050 | 8200 | — | — | 15000 |
| 3 Hours | 8350 | 8300 | — | — | gel |
| 5 Hours | 8350 | 8350 | — | — | — |
| 8 Hours | 8350 | 8300 | — | — | — |
| 10 Hours | 8400 | 8350 | — | — | — |
| State of Coating after 10 hours | good | good | poor | poor | poor |
| Surface State of film | good | good | — | — | — |

APPLICATION EXAMPLES 3-6

The dispersion (I) used in Application Example 1 was treated with 1.5 parts of ethyl alcohol and various amounts of $HS(CH_2)_3Si(CH_3)(OCH_3)_2$. Then changes in viscosity with time was measured as in Application Example 1 with observation of states of coating and film. For comparison, the process was repeated using 1.5 parts of ethyl alcohol, but without $HS(CH_2)_3Si(CH_3)(OCH_3)_2$. The results are given in Table II. The composition with only ethyl alcohol was found to be gelled after 30 min, while the compositions treated with both ethyl alcohol and $HS(CH_2)_3Si(CH_3)(OCH_3)_2$ showed stable viscosity even after 10 hours with good coatability and state of film.

TABLE II

|  | Application Example | | | | Comparative Example |
|---|---|---|---|---|---|
|  | 3 | 4 | 5 | 6 | 4 |
| Composition, parts | | | | | |
| Dispersion | 100 | 100 | 100 | 100 | 100 |
| $HS(CH_2)_3SiMe(OMe)_2$ | .25 | .50 | 1.0 | 2.0 | — |
| Ethanol | 1.5 | 1.5 | 1.5 | 1.5 | 1.5 |
| Properties | | | | | |
| Change of Viscosity (cP) with time | | | | | |
| 0 Hours | 9200 | 9050 | 8400 | 7800 | 9250 |
| 0.5 Hours | 9200 | 8750 | 8350 | 7800 | gel |
| 1 Hours | 9350 | 8750 | 8350 | 7500 | — |
| 2 Hours | 9400 | 8750 | 8500 | 7500 | — |
| 3 Hours | 9500 | 8700 | 8400 | 7500 | — |
| 5 Hours | 9500 | 8700 | 8350 | 7500 | — |
| 8 Hours | 9450 | 8650 | 8350 | 7700 | — |
| 10 Hours | 9550 | 8750 | 8500 | 7600 | — |
| State of Coating after 10 hours | good | good | good | good | poor |
| Surface State of film | good | good | good | good | — |

APPLICATION EXAMPLES 7-10

Rubber base (II) was prepared under the conditions of Application Example 1, except that 90 parts of the hydroxy-terminated dimethylpolysiloxane with molecular weight 520,000 used in Application Example 1 and 10 parts of vinyl group-terminated dimethylpolysiloxane of molecular weight 55000 were used.

Dispersion (II) was prepared under the same conditions of Application Example 1 from 100 parts of the rubber base (II).

Then, 100 parts of dispersion (II) was treated with 1 part of dibutyltin diacetate catalyst and 25 parts of toluene as viscosity control agent. As shown in Table III, the mixture was stirred with 2 parts of $HS(CH_2)_3Si(CH_3)(OCH_3)_2$, 0.5, 2.5, or 5.0 parts of ethyl alcohol. Similar to Application Example 1, the change in viscosity with time was measured and coating films were prepared.

An experiment was also carried out using 2.0 parts of $HS(CH_2)_3Si(OCH_3)_3$ and 1.0 part of ethyl alcohol. A comparative example was made using 2.0 parts of $HS(CH_2)_3Si(OCH_3)_3$ without ethyl alcohol.

The results are given in Table III. Compared with the comparative example, the examples of the present invention showed stable viscosity even after 24 h with good state of films.

TABLE III

|  | Application Example | | | | Comparative Example |
|---|---|---|---|---|---|
|  | 7 | 8 | 9 | 10 | 5 |
| Composition, parts | | | | | |
| Dispersion (II) | 100 | 100 | 100 | 100 | 100 |
| $HS(CH_2)_3SiMe(OMe)_2$ | 2.0 | 2.0 | 2.0 | — | — |
| $HS(CH_2)_3Si(OMe)_3$ | — | — | — | 2.0 | 2.0 |
| Ethanol | 0.5 | 2.5 | 5.0 | 1.0 | — |
| Properties | | | | | |
| Change of Viscosity (cP) with time | | | | | |
| 0 Hours | 8450 | 7400 | 6800 | 7880 | 8350 |
| 1 Hours | 8450 | 7400 | 6800 | 7880 | 8660 |
| 2 Hours | 8650 | 7300 | 6800 | 7750 | 12350 |
| 5 Hours | 8350 | 7300 | 6950 | 7820 | gel |
| 10 Hours | 8600 | 7650 | 6800 | 7950 | — |
| 24 Hours | 8950 | 7850 | 7450 | 7980 | — |
| State of Coating after 24 hours | good | good | good | good | poor |
| Surface State of film | good | good | good | good | — |

APPLICATION EXAMPLES 11-14

Rubber bases (III), (IV), (V), and (VI) were prepared from 90 parts of dimethyl polysiloxane having hydroxyl groups at the ends of molecular chains with molecular weight of about 520,000 used in Application Example 3, 10 parts of dimethyl polysiloxane having vinyl groups at the ends of molecular chains with molecular weight of about 55,000 used in Application Example 3, as well as 5.25 parts (5% with respect to the weight of polysiloxane), 11.11 parts (10% with respect to the weight of polysiloxane), 17.64 parts (15% with respect to the weight of polysiloxane), and 25.0 parts (20% with respect to the weight of polysiloxane) of fumed silica and a specific surface area of 300 m$^2$/g (Aerosil 300, Nippon Aerosil Co., Ltd), respectively. As a comparative example, rubber base (VVI) was prepared without adding the fumed silica. For each rubber base 100 parts were taken to prepare dispersions (III)–(VII) according to Application Example 1. In Application Example 1, 25 parts of toluene were added to 100 parts of the dispersion. In this case, however, it was not added, while 1.0 part of dibutyltin di(2-ethylhexoate) as well as 2.0 part of $HS(CH_2)_3Si(CH_3)(OCH_3)_2$ listed in Table IV and 3.0 parts of ethyl alcohol were added. For the obtained sample, the variation in time of the viscosity was measured in the same way as in Application Example 1.

The above dispersions containing $HS(CH_2)_3Si(CH_3)(OCH_3)_2$ and ethyl alcohol were cast into a Teflon mold of 11×15×0.5 cm and allowed to stand at room temperature for 2 days for evaporation of the solvent then heated in a circulation hot-air oven at 150° C. for 5 min to obtain silicone rubber sheets. These silicone rubber sheets were made into test specimens using a dumbbell puncher. The specimens were tested for tensile strength using a tensile tester at a rate of 30 cm/min.

Usually, an increase in fumed silica content results in poor viscosity stability of dispersions. However, as shown in Table IV, in the examples of the present invention, even with increased fumed silica content, the initial viscosity shows no changes even after 24 h. Since the film tensile strength increases with increasing fumed silica content, the present invention provides both stable dispersion viscosity and silicone rubber films of high strength.

TABLE IV

|  | Application Example | | | | Comparative Example |
| --- | --- | --- | --- | --- | --- |
|  | 11 | 12 | 13 | 14 | 6 |
| Composition, parts | | | | | |
| Dispersion, 100 | (III) | (IV) | (V) | (VI) | (VII) |
| Fume Silica, % of Polysiloxane | 5 | 10 | 15 | 20 | 0 |
| HS(CH$_2$)$_3$SiMe(OMe)$_2$ | 2.0 | 2.0 | 2.0 | 2.0 | 2.0 |
| Ethanol | 3.0 | 3.0 | 3.0 | 3.0 | 3.0 |
| Properties | | | | | |
| Change of Viscosity (cP) with time | | | | | |
| 0 Hours | 7400 | 9200 | 12250 | 17550 | 6300 |
| 1 Hours | 7400 | 9200 | 12250 | 17550 | 6300 |
| 2 Hours | 7300 | 9000 | 11150 | 16600 | 6100 |
| 5 Hours | 7250 | 8600 | 12200 | 15500 | 6050 |
| 10 Hours | 7950 | 8900 | 12250 | 17850 | 6350 |
| 24 Hours | 7900 | 9300 | 11700 | 17200 | 6550 |
| State of Coating after 10 hours | good | good | good | good | good |
| Surface State of film | good | good | good | good | good |
| Tensile Strength, kg/cm$^2$ | 25.5 | 40.3 | 57.3 | 80.5 | 9.8 |
| Overall rating as coating material | * | * | * | * | ** |

*Suitable
**Unsuitable

EFFECTS OF THE INVENTION

The condensation reaction-curing silicone rubber compositions of the present invention containing mercaptoalkyl group-containing di-or trialkoxysilanes and aliphatic monohydroxy alcohols are free from drawbacks of addition reaction curing type and, even when inorganic filler content is increased in dispersion, viscosity stability was excellent, and high-strength films are readily obtained.

That which is claimed is:

1. A silicone rubber composition for treatment of fiber structures consisting essentially of:
   (A) 100 parts by weight of a hydroxy group-terminated organopolysiloxane,
   (B) 0-50 parts by weight of an alkenyl group-terminated organopolysiloxane,
   (C) 3-100 parts by weight of an inorganic filler,
   (D) 0.1-20 parts by weight of an organohydrogenpolysiloxane,
   (E) 0.1-20 parts by weight of a di- or trialkoxysilane containing a mercaptoalkyl group,
   (F) 0.1-30 parts by weight of an aliphatic monohydroxy alcohol,
   (G) 0.1-20 parts by weight of a curing catalyst, and
   (H) an appropriate amount of solvent.

2. A silicone rubber composition in accordance with claim 1 wherein component (A) is an organopolysiloxane rubber.

3. A silicone rubber composition in accordance with claim 1 wherein alkenyl group of the component (B) is vinyl group.

4. A silicone rubber composition in accordance with claim 1 wherein component (C) is finely divided silica.

5. A silicone rubber composition in accordance with claim 1 wherein component (E) is an alkylmercaptopropyldialkoxysilane or a mercaptopropyltrialkoxysilane with alkyl and alkoxy groups of 1-3 carbon atoms.

6. A silicone rubber composition in accordance with claim 1 wherein component (F) is an aliphatic monohydroxy alcohol of 1-5 carbon atoms.

7. A silicone rubber composition in accordance with claim 1 wherein component (A) is a hydroxy group-terminated polydimethylsiloxane, component (B) is an alkenyl group-terminated polydimethylsiloxane and component (D) is a methylhydrogenpolysiloxane.

8. A silicone rubber composition in accordance with claim 1 wherein component (G) is a metal salt of an organic acid.

9. A silicone rubber composition in accordance with claim 1 wherein the component (A) is a hydroxy group terminated polymethylsiloxane rubber, component (B) is an alkenyl group-terminated polydimethylsiloxane, component (C) is finely divided silica, component (D) is a polymethylhydrogensiloxane, component (E) is methylmercaptopropyldimethoxysilane or mercaptopropyltrimethoxysilane, component (F) is an aliphatic monohydroxy alcohol of 1-3 carbon atoms and component (G) is a dibutyltin salt of an organic acid.

* * * * *